March 22, 1949.                     T. CARROLL                     2,464,919
                                    AUGER TABLE
Filed March 6, 1947                                          3 Sheets-Sheet 1
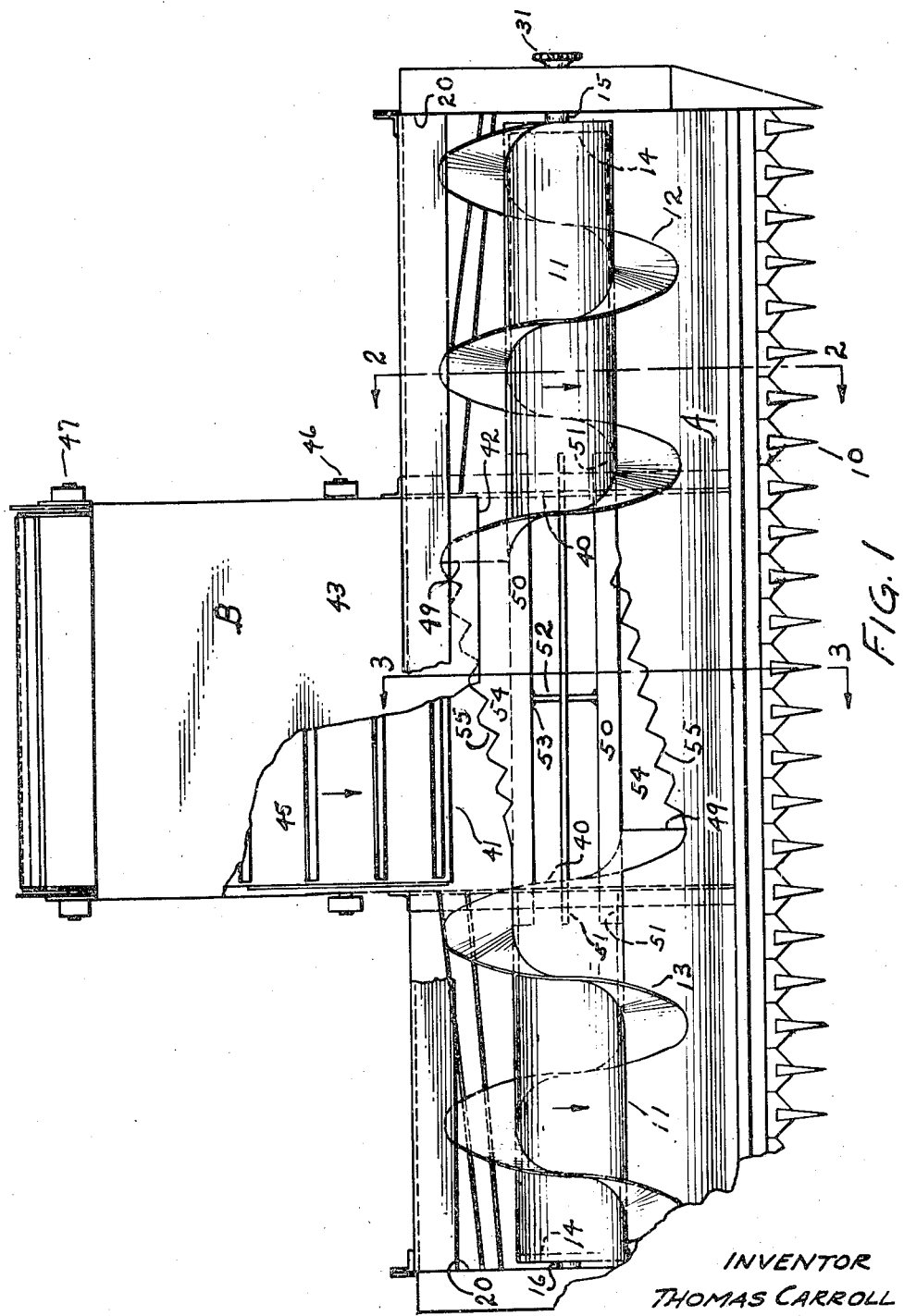

March 22, 1949. T. CARROLL 2,464,919
AUGER TABLE

Filed March 6, 1947 3 Sheets-Sheet 2

INVENTOR
THOMAS CARROLL
BY A. Strotz
ATTORNEY

March 22, 1949. T. CARROLL 2,464,919
AUGER TABLE
Filed March 6, 1947 3 Sheets-Sheet 3
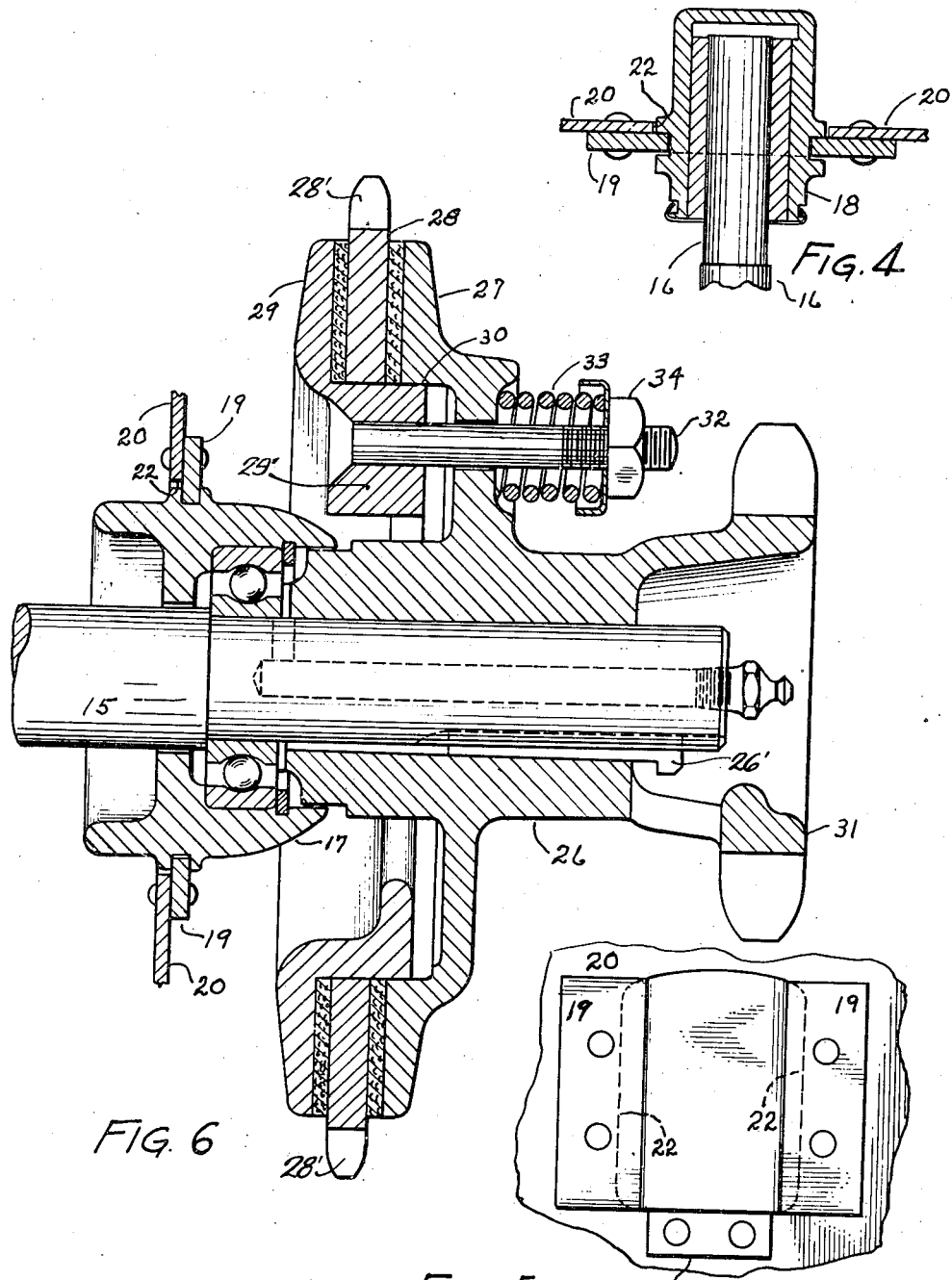

Patented Mar. 22, 1949

2,464,919

UNITED STATES PATENT OFFICE 2,464,919

AUGER TABLE

Thomas Carroll, Toronto, Ontario, Canada, assignor to Massey-Harris Co. Ltd., Toronto, Ontario, Canada, a corporation of Canada Application March 6, 1947, Serial No. 732,705

6 Claims. (Cl. 56—158)

The present invention relates to a combine harvester table having an auger or augers to move the grain toward an outlet and move it rearwardly through the outlet and on an elevator or the like.

An object of the present invention is to provide a harvester table having preferably two augers, one at each end adapted to move the grain to the center of the table and having novel means adapted to discharge the grain rearwardly through the outlet to an elevator.

Augers have been used for many years with more or less success. The bottle neck, so to speak of the system, being the usual means provided for moving the grain rearwardly from the table and through the outlet.

The usual means for final moving of the grain rearwardly from the table, especially if the grain is tall and heavy, has in the past been troublesome and not altogether satisfactory. Therefore the principal object of the present invention is to improve the means for moving the grain from the table and also reduce the fanning effect produced by the conventional means, also to more definitely and efficiently sweep the grain from the bottom of the platform into the outlet.

I accomplish the foregoing objects by eliminating a portion of the large carrying tube at the center or place at which the grain is discharged from the platform and by providing a number of suitably shaped bars as a rigid connection between the inner ends of the tubes and by terminating the auger ends somewhat past the ends of the outlet and by providing suitably shaped and preferably notched plates which are secured to the ends of the augers and to the bars as an extension from the auger ends, the plates preferably gradually diminishing in width toward the other end of their bars.

It is an important object of the present invention to reduce the fanning effect of the means for discharging the grain from the platform to a minimum; therefore the auger tubes and augers are terminated near the ends of the outlet and furthermore by the use of relatively small bars for connecting the tube ends and generally relatively narrow plates which are secured to the bars and ends of the augers.

To these and other useful ends my invention consists of parts, combinations of parts or their equivalents and mode of operation as hereinafter described and claimed and shown in the accompanying drawings in which:

Fig. 1 is a top view of my improved auger table showing a partially sectioned elevator used for conveying the grain to the thresher cylinder.

Fig. 4 is a top sectional view illustrating the carrying bearings for the left end of the auger conveyor.

Fig. 5 is an end view of the carrying means for the auger conveyor bearings.

Fig. 6 is a horizontal sectional view of a friction transmission used as a driving means for the auger conveyor.

Figure 3:
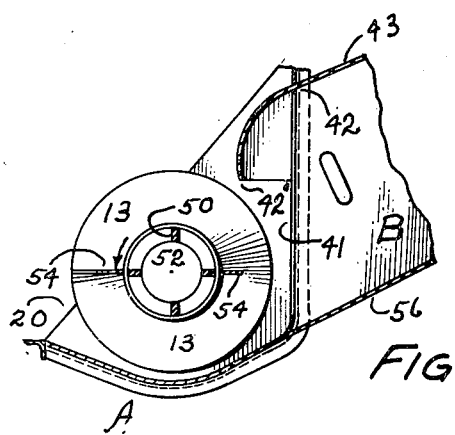
Fig. 3 is a sectional view taken on lines 3—3 of Figure 1.

The important part of my invention is illustrated in Figure 1, the platform of which in its entirety is designated by reference character A having a cutter bar 10 for the length of the platform.

It will be understood that I may manufacture my auger table in various lengths wherein the elevator designated by reference character B may not have the same relative length or position shown.

Figure 1 illustrates a relatively short platform which as shown is about three times the length of the elevator and the augers being shown as having slightly more length than the width of the elevator.

It has been the practice to support the augers on a single tube. I provide two tubes 11—11 on which oppositely directed augers 12 and 13 are mounted. The outer ends of tubes 11—11 have filler plates 14—14 to the center of which are secured shafts 15 and 16. Shaft 15 is rotatably mounted in a bearing 17 and shaft 16 is rotatably mounted in a bearing 18, each bearing being preferably, vertically slidably mounted between plates 19—19. These and stops 25 are rigidly secured to the end plates 20—20 of the platform. An oblong opening 22 is provided in plates 20 through which the ends of bearings 17 and 18 extend, the openings being long enough to permit the bearings to raise above stops 25, for a purpose which has already been explained.

Thus it will be seen that bearings 17 and 18 may rest on stops 25 when the augers are at a predetermined distance from the bottom of the platform. This distance may be, for example, one inch and the openings 22 in members 20 may be long enough to permit the bearings to raise, for example, one inch or more. Thus generally speaking, the auger conveyor is fixed in its position by its weight but may raise slightly because of an accumulation of grain or other material, in order to clear itself and sweep the grain from the platform.

Shaft 15 protrudes a distance through bearing 17 and has keyed thereto a hub 26 by means of a key 26', the hub having a flange 27 with a friction plate 28 on the periphery of which is provided sprocket teeth 28'. Another friction plate 29 has a hub' which is slidably mounted in member 27 as at 30 and a number of spaced bolts 32 which extend freely through member 27 each having a spring 33 and a nut 34 whereby members 27 and 29 are spring held in frictional contact with sprocket plate 28. The sprocket plate is adapted to be driven by a chain and therefore will frictionally drive hub 26 and the auger conveyor; thus if for some reason the auger conveyor becomes clogged this friction drive may slip and protect the mechanism until the operator can stop the combine and clear the auger.

Figure 2:
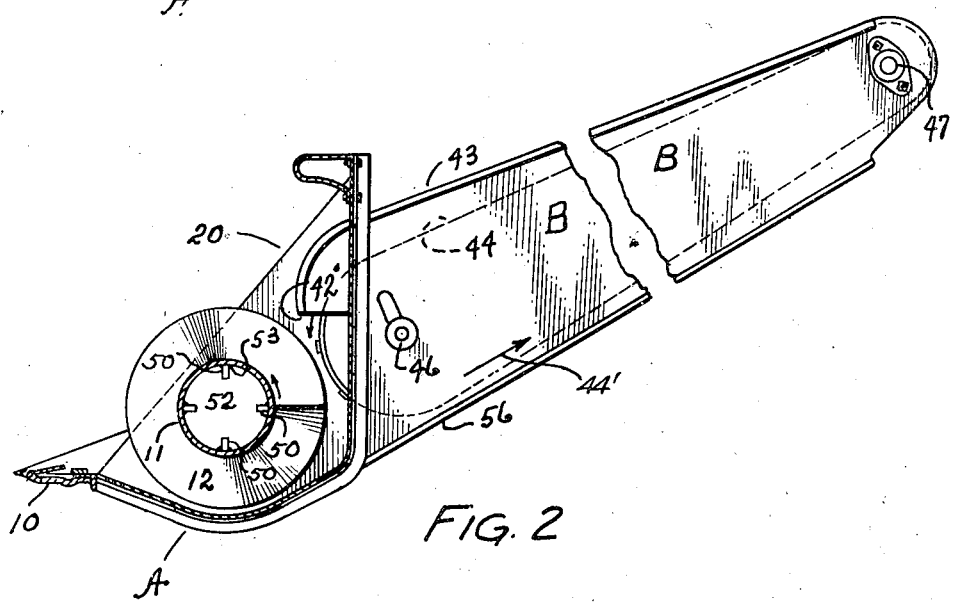
Fig. 2 is a sectional view taken on line 2—2 of Figure 1.

My invention particularly refers to the mechanism between the ends of the augers and tubes. In former devices of the character, considerable space is occupied by the continuous tube and the augers or their equivalents, which extend across the face of the outlet. In the present invention the inner ends of the auger tubes terminate preferably as at 40—40. This it will be noted is substantially in transverse alignment with the ends of the outlet 41. This outlet at its top terminates preferably as at 42 and the top or cover 43 of elevator 44 is preferably curved forwardly and downwardly at its front end and terminating as at 42' as illustrated in Figure 2 so as to shield the elevator 44 and prevent grain from winding around the auger conveyor.

Elevator 44 is mounted on shafts 46 and 47. Plate 25 provides means whereby shaft 46 is fixed in its lowest position but permitted to raise so as to clear an excessive amount of grain.

The inner ends of tubes 11 are secured together preferably by means of solid bars 50, four of them being used and being positioned in spaced relation, their ends being welded to the inner walls of the tubes as at 51. The inner ends of augers 12 and 13 terminate as at 49. In the center of bars 50 I provide a disc 52 which contacts the inner surface of the bars and is welded thereto as at 53.

Thus it will be seen that tubes 11 are secured together by means of heavy bars and that the bars at their centers are anchored together by means of a disc plate forming adequate strength as a rigid connection between the tubes.

At the inner end of each auger I secure plates 54—54, these plates being anchored to their bars 50 by welding or otherwise. The plates are preferably gradually reduced in width toward the other end of the bar and their edges being preferably notched as at 55, so they more definitely engage the grain. The augers turning in the direction indicated by arrows will move the grain toward the center of the device and in front of plates 54, and in a mass somewhat narrower than the width of outlet 41. The inner end of each auger acts to confine the width of the bundles of grain to less than the length of outlet 41 so it will readily pass on to the elevator which moves in the direction indicated by arrows 44' as illustrated in Figure 2, and acts by friction to hold the grain on the bottom plate 56 of the elevator and move it toward the threshing cylinder.

It will be seen that I have provided a novel auger table having novel means for discharging the grain upon or under an elevator and that because of the size, shape and position of the four bars 50 and the two plates 54 there will be very little fanning effect to interfere with the proper delivery of all of the grain into the elevator, and that because of the shape and position of members 50 and 54 the grain will be efficiently swept from the table under all conditions.

Clearly many minor detail changes may be made in the design shown without departing from the spirit and scope of the invention as recited in the appended claims.

I claim:

1. In a harvester table of the character described comprising, a trough having at its forward side a cutter bar, a grain moving auger conveyor and discharging element rotatably mounted at its ends to the ends of said trough, an elevator having an inlet from the rear side of said trough intermediate the ends thereof, said grain moving element comprising two relatively large tubes with their inner ends terminating substantially in transverse alignment with the ends of the outlet, oppositely turned auger elements on said tubes and extending from the outer ends of the tubes to a short distance past the inner ends thereof, four bars rigidly attached at their ends to the inner surface of said tubes and in spaced relation, the inner ends of said augers being positioned on opposite sides of the element and in radial alignment with a bar and having secured thereto a plate which extends to adjacent the inner end of the other tube and being secured to the bar, whereby the grain is moved inwardly by the augers and is then engaged by the plates and bars and discharged into said elevator inlet.

2. A device as recited in claim 1 including, said plates at their contact with the auger ends being substantially the same width as the auger and being gradually reduced in width toward the other auger.

3. A device as recited in claim 1 including, said plates at their contact with the auger ends being substantially the same width as the auger and being gradually reduced in width toward the other auger, and having their outer edges notched to thereby more effectively engage the grain.

4. In a harvester table of the character described comprising, a trough having at its forward side a cutter bar, a grain moving auger conveyor and discharging element rotatably mounted at its ends to the ends of the trough, an elevator having an inlet from the rear side of said trough, said grain moving element comprising a relatively large tube with its inner end terminating substantially in transverse alignment with the near end of the elevator inlet, an auger conveyor secured to said tube and extending from the outer end thereof to a short distance past the near end of the elevator inlet, four bars rigidly attached at their ends to the inner surface of said tube and extending across the face of the elevator inlet and in spaced relation, the inner end of said auger terminating in radial alignment with one of said bars and having secured thereto a plate which extends to within a short distance of the other end of the bar and being secured to the bar, said auger being shaped and turned to thereby move the grain toward said bars and in front of said plate, whereby the grain will be contacted by the bars and plate and moved into said elevator inlet.

5. A device as recited in claim 4 including, said plate at its contact with the auger having a width substantially the same as the width of the auger.

6. A device as recited in claim 4 including, said plate having a width at its contact end with the auger blade equal to the width of the blade and being notched to thereby more readily engage the grain.

THOMAS CARROLL.

REFERENCES CITED

The following references are of record in the file of this patent:

UNITED STATES PATENTS

| Number | Name | Date |
|---|---|---|
| 2,212,465 | Baldwin | Aug. 20, 1940 |
| 2,262,580 | Frankland | Nov. 11, 1941 |
| 2,352,257 | Dray | June 27, 1944 |
| 2,369,745 | Millard et al. | Feb. 20, 1945 |
| 2,426,922 | Carroll | Sept. 2, 1947 |